G. P. VAN WYE.
EGG TESTER.
APPLICATION FILED AUG. 28, 1911.

1,064,793.

Patented June 17, 1913.

Witnesses:

Inventor
Garry P. Van Wye

UNITED STATES PATENT OFFICE.

GARRY P. VAN WYE, OF NEW YORK, N. Y.

EGG-TESTER.

1,064,793.

Specification of Letters Patent.

Patented June 17, 1913.

Application filed August 28, 1911. Serial No. 646,301.

*To all whom it may concern:*

Be it known that I, GARRY P. VAN WYE, a citizen of the United States, and a resident of New York, in the county and State of New York, have invented a new and useful Egg-Tester, of which the following is a specification.

This invention relates to devices for candling eggs; and especially to that class adapted to be used by the housewife; and the object of my invention is to provide a device that is cheap to manufacture, and which is easy to use whereby the housewife may quickly determine the quality of an egg.

The invention is illustrated in the accompanying drawing, in which—

Figure 1:
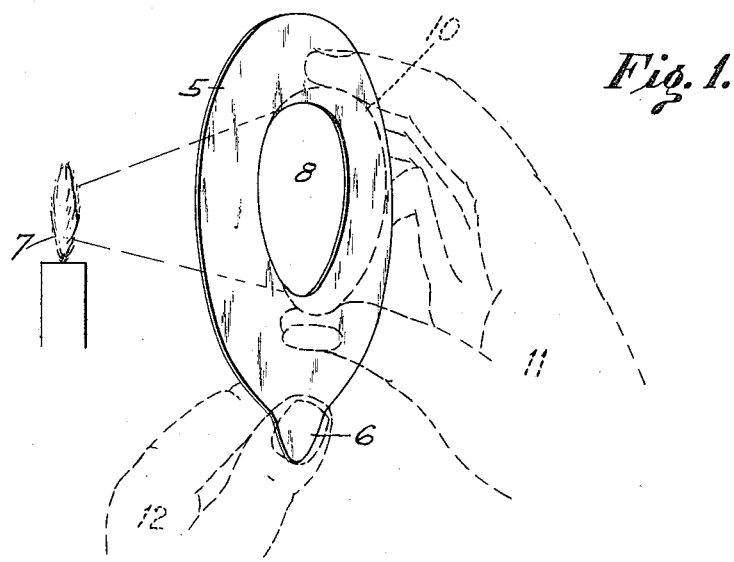
Figure 2:
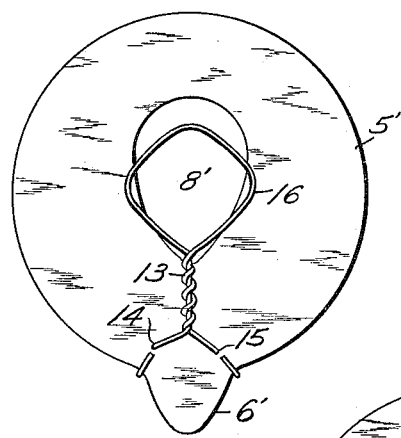
Figure 3:
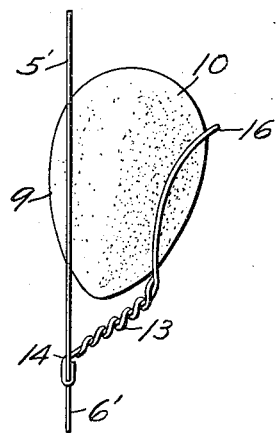
Figure 4:
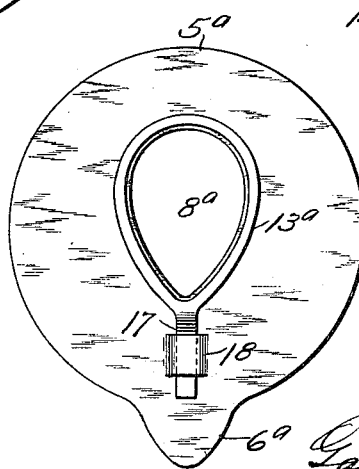

Figure 1, is a perspective view of an egg tester constructed according to my invention, the use of the same being illustrated; Fig. 2, is a front elevation of a modified form of construction; Fig. 3, is a side view thereof, with an egg in position; and Fig. 4, is a front elevation of another modified form of construction.

In the accompanying drawing the several parts are indicated by similar numerals of reference in each of the views.

In practice I provide a plate, or shield 5, which is provided with a handle, or portion 6 easy to grasp in the hand, whereby the device may be held in an upright position before a candle or light 7; and the shield is also provided with an elongated opening 8, preferably egg-shaped in form and of a size adapted to permit but a portion 9, of an egg 10, to pass through the same, as clearly shown in Fig. 3. The opening 8, is so disposed that the long axis thereof is either coincident with the axis of the shield passing through the handle, throughout its extent; or the axis of this opening is at such an angle to the said axis of the shield and handle that the axes will have at least a point in common. Thus an egg 10, can be held with one hand 11, while the shield is held upright by the other hand, as 12, without interfering with the rays of light from the candle 7, reaching the eye of the operator, and an egg tester is provided which is very cheap to manufacture and efficient in use. I find, too, that by making the opening 8, elongated instead of circular, and shaping the opening so an egg can be held with its side against the walls of the opening in a manner to exclude the rays of light passing between the walls of the opening and the egg, the quality of the egg can be determined much more readily than where a circular opening is used and the egg is inserted endwise.

It will thus be seen that I have provided an egg tester which is cheap to manufacture, and which can be used in day light for the candling of eggs as the shield will shut off the rays of light from the eye of the observer sufficiently to enable the egg to be thoroughly examined.

In Figs. 2, and 3, I have shown an additional feature in that a wire holding frame 13, is used which is preferably clamped to the plate near the handle 6' by passing the wire ends through the plate, as shown at 14, and 15, and clamping the same around the shield on either side of the handle. However, the wire holding frame may be attached to the shield in various ways so I do not wish to limit myself to any particular manner of making the connection. It is desirable, however, that the wire frame be so attached that the loop 16, will be held a less distance from the plate normally than the thickness of an egg whereby when the egg 10, is in position, it will be held by the wire frame with a spring action, as will be readily understood, whereby the egg will be held in the opening 8', of the shield 5', in a firm manner with a comparatively small wire composing the frame. In practice, by making the frame in this way a wire so small in diameter can be used that the thickness of the same will not interfere in an appreciable manner with the observation of the egg.

In Fig. 4, the shield $5^a$, has the opening $8^a$, arranged relative to the handle $6^a$, the same as in Fig. 1. In this construction, however, I use a holding frame $13^a$, stamped out of sheet metal, instead of the wire frame shown in Figs. 2, and 3; and this frame is preferably held on the shield by passing the stem 17, through a slotted portion 18, of the plate. In practice I make this holder so it will hold the egg with a spring action, as described relative to Figs. 2, and 3.

Having thus described my invention what I claim as new and desire to secure by Letters Patent of the United States is—

1. As an article of manufacture, an egg tester comprising a single piece of sheet material having a part formed into a handle whereby said shield may be held before a light, and having a single elongated opening therein so positioned that a part of the long axis thereof will have at least a point in common with the axis of the handle portion, for the purpose set forth.

2. An egg tester comprising a plate or shield having an elongated opening centrally thereof and a handle with the axis of the shield and handle coincident with the long axis of said opening; and an egg holder comprising a wire frame secured to said shield adjacent to said handle and having a loop extending over said opening in the shield, said frame being proportioned and disposed to hold an egg with a spring action, for the purpose set forth.

Dated this 26th day of August, 1911.

GARRY P. VAN WYE.

Witnesses:
JAMES A. WHITE,
CLIFFORD R. HOBBS.

Copies of this patent may be obtained for five cents each, by addressing the "Commissioner of Patents, Washington, D. C."